Inventors
Joseph Gregory Green
and Roberto Ortiz-Muniz
By Petherbridge, O'Neill & Aubel
Attys.

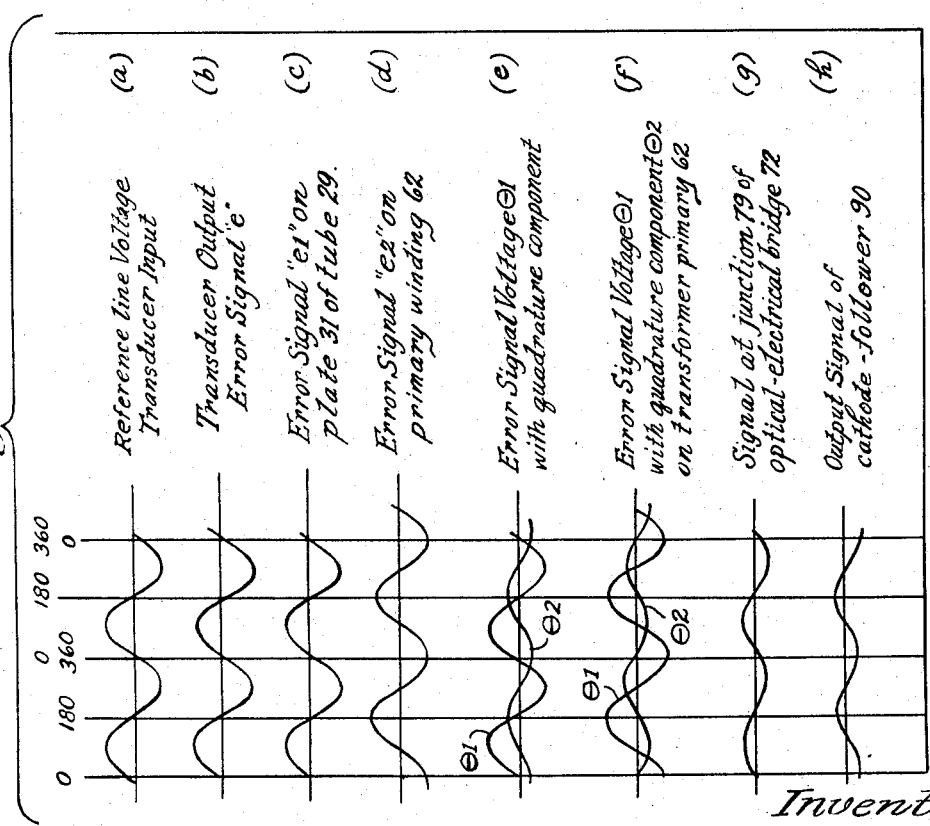

United States Patent Office 3,368,637
Patented Feb. 13, 1968

3,368,637
QUADRATURE COMPONENT DETECTOR
AND SUPPRESSOR
Joseph G. Green, Beloit, Wis., and Roberto Ortiz-Muniz, Mayaguez, Puerto Rico, assignors to Fairbanks Morse Inc., New York, N.Y., a corporation of Delaware
Filed Dec. 1, 1965, Ser. No. 510,815
4 Claims. (Cl. 177—211)

ABSTRACT OF THE DISCLOSURE

A circuit is disclosed for suppressing an input signal in quadrature time phase relation with respect to a desired reference signal. The reference and input signals are coupled to an electrical bridge having light sources connected in the arms of the bridge. Photo resistive elements connected in the arms of a second electrical bridge selectively receive an illumination from the light sources dependent on the time phase relation of the reference and input signals. A feedback signal, generated in the second bridge responsive to said illumination, is coupled therefrom to suppress the quadrature component of the input signal.

---

This invention relates to circuitry for detecting and suppressing undesired quadrature time-phased components in an alternating current signal. Such circuitry is particularly useful in measuring systems which employ servo-driven, null-balancing bridge devices.

Servomotors of the two-phase induction type having two-phase windings; i.e., a control winding and a reference winding which are displaced 90 electrical space-degrees apart, are common in null-balancing systems in which the servomotor is the positioning device which provides the feedback signal within the balancing circuitry to achieve a null condition. In such systems, as for example, in electronic weighing systems employing a strain-gauge type transducer as the load sensing element, it is important that the signal voltage derived from the balancing portion of the circuitry, and which voltage is impressed on the control winding, be 90 electrical space-degrees from the signal impressed on the reference winding.

A signal voltage on the control winding that is not exactly 90 electrical degrees from the voltage on the reference winding can be vectorially resolved into two voltage components; the first component will be 90 electrical degrees from the reference voltage, and the second component will be 90 electrical degrees from the first component, thus making the second vector voltage either in-phase or 180 degrees out-of-phase with the reference voltage. This second vector voltage can be defined as the quadrature voltage, since it is the quadrature component of the true control voltage. Quadrature voltage may be caused by any one or more of several reasons, such as, transmission line capacitance, inductive reactance of signal coupling transformers, induced extraneous voltage pickups, etc. Quadrature voltage is detrimental to precise measurement instrumentation in that the servomotor and other system elements, such as amplifiers, may react to this quadrature voltage causing sluggish servomotor operation with a resulting effect of inaccurate null-indicating positioning.

This invention is thus directed to circuitry for detecting the presence of a quadrature voltage component of a control voltage signal, regardless of the cause of the quadrature voltage, and to circuitry for suppressing said quadrature voltage.

Several methods or systems are well-known and have been described in prior art for the reduction of the effects caused by the presence of an undesired quadrature voltage. One prior art system utilizes a second separate servomotor so arranged in a circuit configuration as to be energized only in the presence of a quadrature component of the control signal. When a quadrature voltage component is present, the second servomotor will be caused to rotate, and its direction of rotation will be determined by the phase relationship of the quadrature component; that is, leading or lagging, to its own reference vector. The rotation of the servomotor positions a device, such as wiper arm on a potentiometer, to provide a voltage output in proper magnitude and phase, which is introduced into the system circuitry to effect cancellation of the quadrature component. Such prior art systems are slow in response, since the corrective action of starting, positioning and stopping mechanical-electrical devices such as servomotors is not fast enough to follow rapid changes in quadrature level; and, further, such prior art systems are complicated in construction and require expensive components in their manufacture. The present invention obviates these faults of the prior art by providing a circuitry that is automatic, fast of response, compact, requires only inexpensive components, and is of simple electrical construction requiring no electro-mechanical devices.

It is, therefore, a principal object of this invention to provide improved circuitry for the detection of any signal in quadrature time-phase relationship to a desired signal which circuitry will provide a rapid response to rapid changes in the quadrature voltage level.

It is another object of this invention to provide improved circuitry for the detection of any signal in quadrature time-phase relationship to a desired signal and to provide feedback circuitry useful for suppressing the quadrature signal.

It is another object of this invention to provide a quadrature detection and feedback suppression circuit wherein the circuitry contains no electro-mechanical moving parts.

The present invention operates to detect the presence of any voltage component that is in quadrature time-phase relationship to a desired signal by means of optical-electrical circuitry and which developes a correction voltage in proper magnitude and phase relationship to permit, by feedback means, a suppression of the quadrature voltage.

Accordingly, it is still another object of this invention to provide improved circuitry comprising optical-electrical means for detecting the presence of an undesired quadrature voltage component.

It is furthermore another object of this invention to provide improved circuitry for the detection of quadrature voltage wherein the circuit utilizes photo-responsive means.

It is another object of this invention to provide circuitry for detecting the presence of a quadrature voltage component and for providing a feedback means for permitting suppression of this quadrature component, which circuitry is independent in its functional operation from that of other associated control circuitry so that inclusion or exclusion of the detection and feedback circuitry will not affect any previously established balance calibration condition.

The foregoing and other objects, features and advantages of the present invention will be apparent from the following more particular description of preferred embodiments of the invention, as illustrated in the accompanying drawings wherein like reference numerals refer to like elements throughout.

Figure 2:
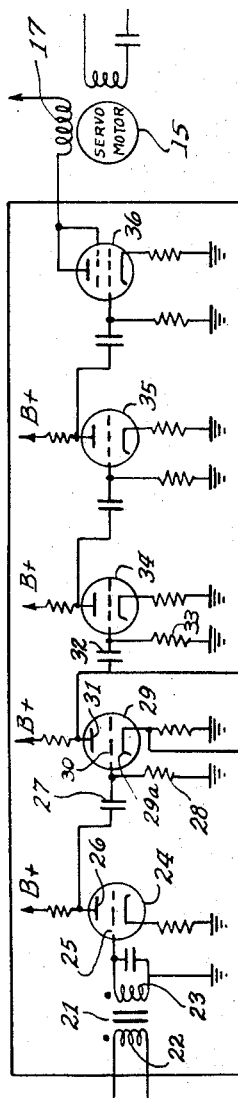
FIG. 2 is a schematic circuit diagram of the quadrature detection and feedback suppresssion circuitry, according to the invention. A schematic circuit diagram of the amplifier of FIG. 1 is also shown in FIG. 2 to better illustrate the operation of the invention.
Figure 2:
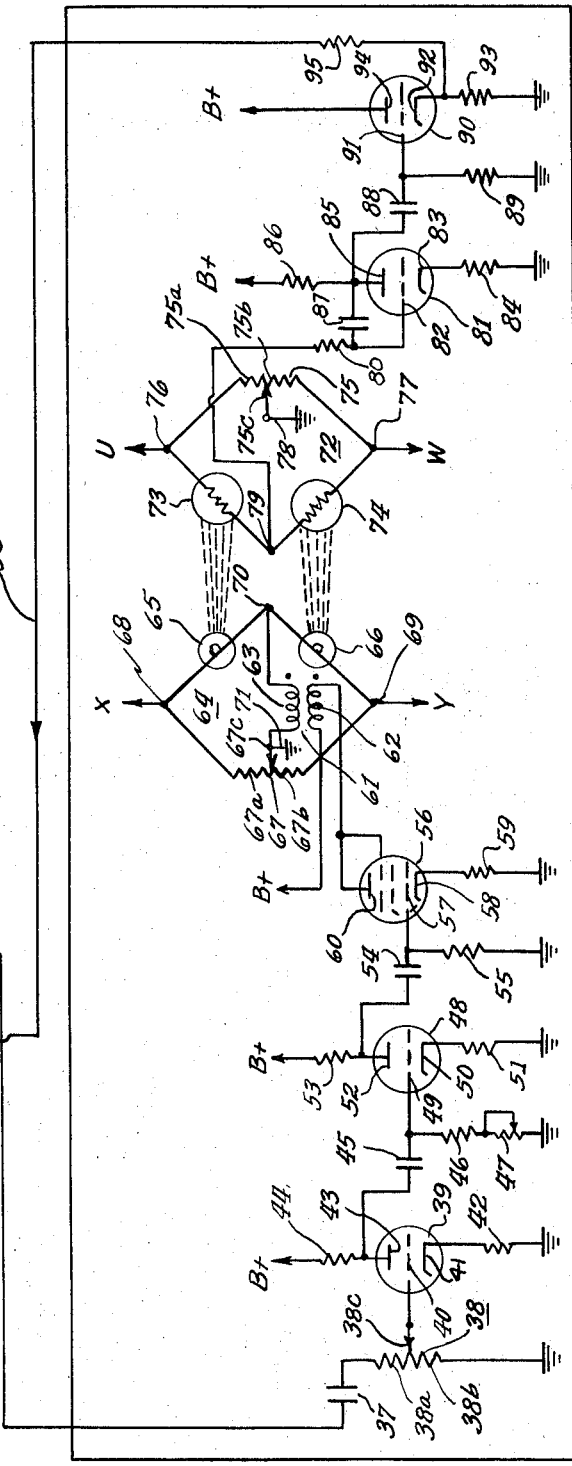

FIG. 3, (a) through (h) are sine wave, phase-related diagrams useful in explaining the operation of the inventive circuit of FIG. 2; and, FIG. 4, (a) through (d) are vector diagrams useful in explaining the operation of FIG. 2.

Figure 1:
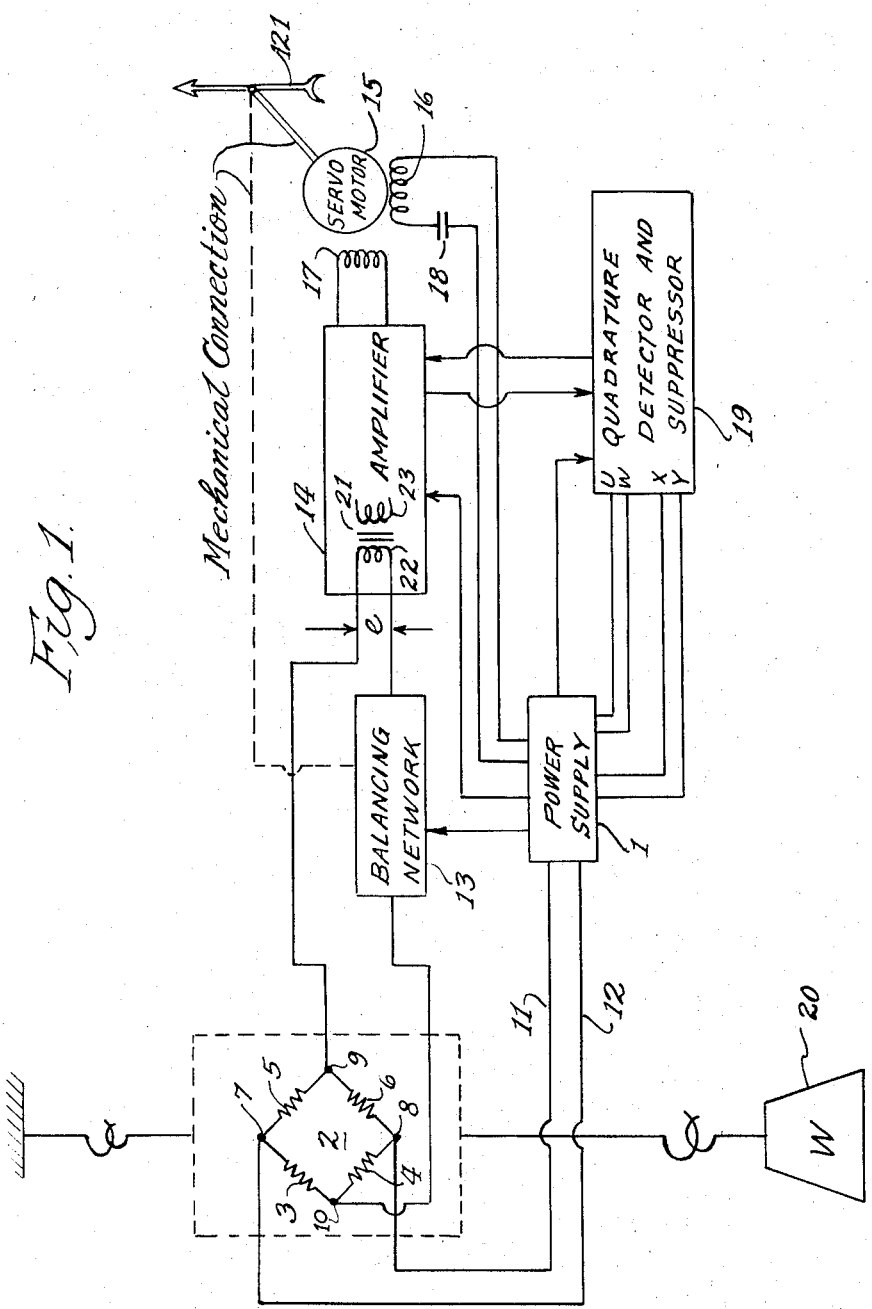
FIG. 1 is a block diagram of a representative system incorporating the quadrature detection and suppression circuitry in accordance with the present invention.

FIG. 1 is illustrative of a typical system in which the presence of a quadrature voltage component on the servomotor control phase can be detrimental to the operation of the system. Specifically, FIG. 1 illustrates a weighting system of the strain-gauge transducer, servo-driven, null-balancing bridge type, and includes a block indicative of the quadrature detection and suppression circuit according to the present invention.

In FIG. 1, a power supply 1 represents an overall power supply, of any suitable known type, to provide the electrical energy required for each of the various electrical, electronic and optical circuits of the system. Power supply 1 furnishes an alternating current input to transducer 2 which is of the resistance strain-gauge bridge type and is illustrated as a conventional Wheatstone bridge. The resistances 3 and 4, which are connected in series, form one side of the bridge, while resistance 5 and 6 are connected in series to form the other side of the bridge. Terminal 7 formed by the junction of resistance 3 and 5, and terminal 8 formed by the junction of the resistances 4 and 6 are input terminals of the transducer 2, while terminal 9 formed by the junction of resistances 5 and 6, and terminal 10 formed by the junction of resistances 3 and 4 constitute the output terminals.

Power supply 1 couples alternating current through conductors 11 and 12 to terminals 7 and 8, and the phase of this alternating current will hereinafter be referred to as "reference line voltage" in order to establish a reference voltage to which other alternating current voltages will be phase-related in the descriptive material which follows. Power supply 1 also furnishes alternating current to the various circuits comprising balancing network 13, to the alternating current terminals labeled X–Y and U–W in the quadrature detection and suppression circuit 19, and to reference winding 16 of servomotor 15. A capacitor 18 phase-shifts the alternating current coupled to winding 16 by 90 electrical degrees from the reference line voltage.

Power supply 1 also furnishes direct current to amplifier 14 and to various circuits in the quadrature detector and suppressor device 19.

The foregoing connections of the power supply 1 to the system are illustrated in more detail in FIG. 2 and are explained in the description of FIG. 2.

In operation, a weight 20, whose value is to be determined, is imposed upon transducer 2 and an output voltage will appear across terminals 9 and 10, the value of which will be proportional in magnitude to the weight. This output voltage is often referred to as "transducer output voltage." It will be assumed that this transducer output voltage is in-phase with respect to the reference line voltage previously defined, although it may be 180 degrees out-of-phase, depending upon a previously established zero-weight condition of the system. However, as will be evident in later discussions, either phase relationship is acceptable, and in no way influences the operation of the quadrature detector and suppressor device 19 of the present invention.

A balancing network 13 is connected in series relationship with output terminal 10 of transducer 2, and is in electrical bucking opposition to the transducer output voltage. Initially, with the system ready to receive a weight, a balance condition exists and no voltage will be delivered from balancing network 13. When a weight is imposed on the transducer an unbalance condition will result and the amount of unbalance voltage appearing at the output of balance network 13 will be representative of the imposed weight. This value of unbalance voltage is referred to as "error voltage" and is labeled "e" in FIG. 1. The phase relationship of the error voltage to the reference line voltage, either in-phase or 180 degrees out-of-phase, is important for present purposes only in that it defines the direction of unbalance. The error voltage "e" is impressed on the primary winding 22 of amplifier input transformer 21. The return path of the primary winding 21 is connected to output terminal 9 of transducer 2, to provide a closed-loop system for transducer 2 and balancing network 13. The error signal appearing across primary winding 22 will be amplified by transformer action and will appear across secondary winding 23 of transformer 21. Further amplification of the error signal will take place within amplifier 14. The initial phase relationship of the error signal to the reference line voltage is maintained by transformer 21 and amplifier 14.

The error signal output of amplifier 14 is impressed on control winding 17 of servomotor 15. Note that the phase relationship of the error signal to the reference line voltage is either in-phase or 180 degrees out-of-phase, while the voltage on reference winding 16 of servomotor 15 has been displaced 90 degrees from the reference line voltage. Accordingly, the servomotor 15 will be caused to rotate in a direction depending upon whether the error voltage is in-phase or 180 degrees out-of-phase with respect to the reference line voltage.

While the illustrated system herein describes a servomotor wherein the control winding voltage is maintained in-phase or 180 degrees out-of-phase with respect to the reference line voltage and the reference winding of the servomotor is phase-shifted 90 degrees; this is only illustrative of one method currently used. Systems are well-known in the art in which the voltage on the reference winding is arranged to be in-phase with the reference line voltage and the voltage on the control winding is phase-shifted in the amplifier, or elsewhere. The means employed to accomplish the phase-shifts for operating the servomotor does not affect the essence of the quadrature detector and suppressor device 19 of this invention.

When servomotor 15 rotates as described above, the balancing network 13 is driven through suitable known mechanical means to a condition such as to reduce the error signal substantially to zero at which point servomotor 15 stops. Servomotor 15 will concurrently position indicator 121, such as by gearing, to provide a visual indication of the value of weight 20. Such systems as heretofor described are well-known in the art, as exemplified by Thorsson et al. Patent 2,766,981 assigned to the same assignee as the present invention.

As discussed hereinabove, should the error signal contain a quadrature voltage component, such a quadrature component is detrimental to efficient and accurate system operation, and hence there is need for a means for detecting the presence of the quadrature component and for providing a feedback signal for suppressing this undesired quadrature voltage. Accordingly, the quadrature detector and suppressor device 19 is arranged to accept a signal representative of the error signal, detect any quadrature component present, and to provide a signal in proper phase relationship and of sufficient magnitude which is coupled or fed back to the system to suppress the quadrature component.

Refer now to FIG. 2 which shows a complete schematic diagram of quadrature detector and suppressor 19 according to the present invention. For purposes of clarifying the operation of the quadrature detector and suppressor 19, FIG. 2 also includes a schematic diagram of a suitable known amplifier 14 useful with servomotor systems of the type herein described.

As previously described, when an unbalance condition exists between balancing networks 13 and transducer 2, the amount of unbalance is the error voltage "e," which is impressed upon the primary winding 22 of the amplifier input transformer 21. Since the error voltage "e" is in-phase with the reference line voltage, thus by arranging the primary winding 22 and secondary winding 23 to provide a "plus" polarity as shown by the dots on the windings, an amplified error signal voltage is impressed on grid 25 of triode vacuum tube 24.

Triode vacuum tube 24 serves as a voltage amplification stage whose design configuration is well-known in the art as is also true of all stages shown for amplifier 14. As mentioned above, the various stages of amplifier 14 are shown in detail to clarify the signal path as it pertains to the quadrature detector and suppressor 19 of the invention. The signal voltage thus appearing on grid 25 of tube 24 is amplified and appears at plate 26 of tube 24 amplified and inverted in phase. The signal at plate 26 is coupled by means of the network comprising capacitor 27 and resistor 28 to grid 30 of triode vacuum tube 29. Triode 29 amplifies the signal appearing at its grid 30 and the signal appears at its plate 31 amplified and inverted in-phase. The signal at plate 31 of triode 29 is in-phase with the error voltage "e" that constituted the input to amplifier 14.

The signal at plate 31 of triode 29 is now directed along two independent paths, one path being further amplified in amplifier 14, and the other path being the input to quadrature detector and suppressor 19. The first path of the signal may be traced from plate 31 of vacuum tube 29, through the network comprising capacitor 32 and resistor 33 to the grid of vacuum tube 34 where further amplification takes place. Similarly, vacuum tube 35 provides additional voltage amplification and finally vacuum 36 provides power amplification from which the amplified signal is impressed on control winding 17 of servomotor 15, causing servomotor 16 to rotate in a manner previously described.

The second path of the signal appearing on plate 31 of amplifier 14 may be traced through lead 31A, capacitor 37, resistance portions 38a of potentiometer 38, and slider tap 38c to the grid 40 of triode 39. Triode 39 may be of any known type suitable for providing voltage amplification. Resistance portion 38b has one terminal connected to ground and potentiometer 38 thereby serves as a voltage divider and hence provides gain control for the signal being coupled to grid 40 of triode tube 39. Cathode 41 of triode 39 is connected through biasing resistor 42 to ground reference. Plate 43 of triode 39 is connected through load resistor 44 to a direct current lead, labeled B+, connected to power supply 1.

The triode 39 amplifies the signal, and the signal is coupled from plate 43 through capacitor 45 to the grid 49 of a triode vacuum tube 48. The grid 49 of triode 48 is also connected through a resistor 46, and a potentiometer 47 connected as a rheostat, to ground. Resistor 46 and potentiometer 47 act as a load to the signal and permit a degree of phase-shift control for purposes to be later described. Cathode 50 of triode 48 is connected through a biasing resistor 51 to ground reference, and the plate 52 of triode 48 is connected through load resistance 53 to a suitable direct current terminal, labeled B+, connected to power supply 1.

The signal appearing on plate 52 is coupled through capacitor 54 to the grid 57 of a power amplifying tube 56 which may be of any suitable known type such as a 6V6. Grid 57 is connected through resistor 55 to ground reference. Cathode 58 of tube 56 is connected through biasing resistor 59 to ground reference, and plate 60 of tube 56 is connected through primary winding 62 of transformer 61 and thence to a direct current terminal B+ connected to power supply 1. Primary winding 62 thus acts as a plate load for tube 56.

The signal voltage developed across primary winding 62 of transformer 61 is phase-displaced 90 degrees from the phase relationship existing on plate 31 of amplifier 14 and coupled to input capacitor 37. This phase displacement is an important factor of the quadrature detection and is accomplished by proper selection of the values for capacitors 37, 45 and 54, and resistance values of potentiometers 38 and 47, and resistors 46 and 55. Also, potentiometer 47 is provided to enable a calibration or "fine" adjustment to be made on the circuit to assure the signal on primary winding 62 is in fact phase-shifted 90 degrees from that of the signal appearing on plate 31 of amplifier 14.

The secondary winding 63 of transformer 61 is connected across opposite corners of an optical-electrical bridge 64. The positive polarities, with respect to each other, of transformer windings 62 and 63 are indicated by the dots in FIG. 2. Optical-electrical bridge 64 consists of a pair of light sources in the form of lamps 65 and 66 connected in series with one another and a potentiometer generally labeled 67. Each of lamps 65 and 66 is a respective arm of optical-electrical bridge 64. A slider 67c on potentiometer 67 effectively divides potentiometer 67 into two resistances 67a and 67b, each resistance being one of the other two arms of optical-electrical bridge 64. Slider 67c is connected to ground, thus becoming a stable reference point for optical-electrical bridge 64. A terminal 68, which is the junction of resistance 67a and lamp 65, and terminal 69, which is the junction of resistance 67b and lamp 66, are the input terminals of optical-electrical bridge 64, and these terminals are connected to a source of alternating current, labeled X-Y, from power supply 1. The phase of the alternating current input to terminals X-Y is in-phase with the reference line voltage and therefore in-phase with the signal coupled to input capacitor 37. Terminal 71, which is the junction of resistors 67a and 67b, as established by the position of slider 67c, is connected to one end of secondary winding 63 of transformer 61; the other end of secondary winding 63 is connected to terminal 70 which is the junction of lamps 65 and 66.

It is well-known in electrical bridge circuit analysis that if the voltage level at terminal 70 is equal to the voltage level at terminal 71, the bridge is in balance and there will be no current flow through secondary winding 63 of transformer 61. To establish an initial balance condition with terminal 71 connected to ground, and with no signal impressed on primary winding 62, the optical-electrical bridge 64 is brought to balanced condition by adjustment of slider 67c of potentiometer 67 until a minimum voltage indication, as measured on a voltmeter, is obtained at terminal 70. Since the supply voltage across terminals X-Y coupled to optical-electrical bridge 64 is alternating current voltage, and since terminal 71 is grounded, then when bridge 64 is in balance there will be an equal current flow through lamps 65 and 66, but the current flow through lamp 65 will be of opposite phase to the flow of current through lamp 66. Equal current flow through lamps 65 and 66, will cause the lamps to light with equal brilliance. As will be described more fully hereinbelow, a signal voltage impressed on primary winding 62 of transformer 61, and which is in-phase with supply voltage X-Y, will cause lamps 65 and 66 to light with unequal brilliance, while a signal voltage in quadrature phase relationship to supply voltage X-Y will cause lamps 65 and 66 to light with equal brilliance. It is thus that the presence of a quadrature voltage component of an error signal "e" is detected, as will be explained.

A second optical-electrical bridge, generally labeled 72, includes a pair of so-called photo-responsive, photo-sensitive or photo-resistive elements 73 and 74, of any suitable known type, connected in series with one another. Each of photo-resistive elements 73 and 74 form one arm of optical-electrical bridge 72. A potentiometer, generally labeled 75, is divided by a slider 75c into two resistances 75a and 75b, each resistance being one of the remaining two arms of optical-electrical bridge 72. Slider 75c is connected to ground, thus establishing a stable reference point for optical-electrical bridge 72. Terminal 76 which is the junction of photo-resistive element 73 and resistor 75a, and terminal 77, which is the junction of photo-resistive element 74 and resistor 75b are the input terminals of optical-electrical bridge 72 and these terminals are connected to a source of alternating current, labeled U–W, from power supply 1; the phase of this alternating current being in-phase with the signal at input capacitor 37. Slider 75c is, as previously mentioned, connected to ground at terminal 78. Terminal 79, which is the junction of photo-resistive elements 73 and 74, is directly connected through resistor 80 to grid 82 of triode vacuum tube 81. The first optical-electrical bridge 64 is optically coupled to the second optical-electrical bridge 72 by means of light energy from lamp 65 impinging upon a photo-resistive element 73 and light energy from lamp 66 impinging upon a photo-resistive element 74.

With first optical-electrical bridge 64 in balance, as previously explained, and thereby causing equal illumination of lamps 65 and 66, photo-resistive elements 73 and 74 will be of equal resistance value since each receives light energy equal to the other. A balanced condition of second optical-electrical bridge 72 under this condition of equal illumination is achieved by positioning slider 75c of potentiometer 75 until a minimum voltage level with respect to ground is established at terminal 79. Any subsequent unbalance of optical-electrical bridge 72 caused by unequal illumination of lamps 65 and 66, as would result from the presence of a quadrature component in error signal voltage "e" as will shortly be described, will result in a signal voltage appearing at terminal 79. The signal voltage at terminal 79 will have a magnitude depending upon the amount of unbalance in optical-electrical bridge 72 due to the amount of difference of illumination between lamps 65 and 66 of optical-electrical bridge 64, and will be in a phase relationship with respect to the reference line voltage dependent upon which of the two lamps 65 and 66 is illuminated more brilliantly. The presence of a quadrature voltage component in error signal "e" is thus detected, and its phase and relative magnitude is established.

A signal voltage appearing at terminal 79 will be impressed upon grid 82 of triode vacuum tube 81 through resistor 80. Triode 81, which may be an amplifying tube of any suitable known type, has its cathode 83 connected through biasing resistor 84 to ground and its plate 85 connected through load resistor 86 to the lead B+ connected to power supply 1. Also, a feedback capacitor 87 is connected between plate 85 and grid 82. The signal voltage impressed on grid 82 is amplified in triode 81 and is coupled from plate 85 through a capacitor 88 to the grid 91 of a triode tube 90. Triode tube 90 is connected as a cathode-follower, having its cathode 92 connected through load resistor 93 to ground and its plate 94 connected directly to the lead labeled B+ coupled to power supply 1, and its grid connected through a resistor 89 to ground. Triode 90 may be of any known suitable type, it not being uncommon to include triodes 81 and 90 in a single envelope such as in a 12AU7 tube. As is known, a signal coupled to the grid of a cathode follower will appear on the cathode as a signal substantially equal in magnitude and of the same phase as the grid signal.

In this present invention, components comprising the circuitry of triode 81 and triode 90 are selected such as to effect a 90 degree phase-shift of the input signal from terminal 79 to its appearance on cathode 92. The output signal at cathode 92 is directly coupled through resistor 95 and lead 96 to cathode 29a of triode tube 29 in amplifier 14 to cause suppression of the quadrature voltage component in the error signal amplified voltage.

To more clearly explain the functioning of the present invention in detecting the presence of a quadrature component of an error signal voltage and of providing a feedback signal for suppression of the quadrature component, two conditions of error signal voltage quality will be considered: firstly, an error signal voltage having no quadrature component; and, secondly, an error signal voltage having a quadrature component.

Assume that optical-electrical bridge 64 and optical-electrical bridge 72 have been brought into balanced condition in a manner previously explained; that potentiometer 47 has been adjusted so that a 90 degree phase-shift exists between the signal input tube 39 and the output of tube 56 at plate 60; and, that the error signal input to amplifier 14 is free of quadrature and is in-phase with the reference line voltage. The quadrature detector and suppressor device 19 will process this error signal, as will now be described.

The error signal "e" is in-phase with reference line voltage as shown by comparing FIG. 3b with FIG. 3a; FIG. 3b being the error signal voltage "e" and FIG. 3a being the reference line voltage. The initial error signal "e" is coupled by transformer 21 to tube 24, amplified by tube 24 and again amplified by tube 29, and appears at plate 31 of tube 29 as an amplified error signal "e1" in-phase with the reference line voltage of FIG. 3a. FIG. 3c shows the error "e1" related in phase to the reference line voltage shown in FIG. 3a. Signal voltage "e1" is the input signal to quadrature detector and suppressor 19, and is coupled from plate 31 through capacitor 37 to grid 40 of tube 39. Signal "e1" is amplified by tubes 39, 48 and 56 where it appears on primary winding 62 of transformer 61 as error signal "e2" phase-shifted 90 degrees from error signal "e1" as shown in FIG. 3d referenced to FIG. 3c.

Error signal "e2" is coupled by transformer action into optical-electrical bridge 64. The effect of coupling signal "e2" into optical-electrical bridge 64 is explained by reference to FIG. 4a which is a vector diagram of the voltages appearing in optical-electrical bridge 64. Vector V1 is the voltage across lamp 65 and vector V2 is the voltage across lamp 66, both vectors represent the supply voltage applied across terminals X–Y, with vector V2 being equal in magnitude but opposite in phase to vector V1, for reasons previously explained. Vector Ve3 is the voltage vector representing the output of transformer secondary winding 63 due to error signal voltage "e2" input on primary winding 62. Vectorially combining signal vector "Ve3" which is 90 degrees to both vectors V1 and V2, produces a new voltage V1a across lamp 65 and a new voltage V2a across lamp 66. As can be seen in FIG. 4a, vector V1a is equal to V2a, causing lamps 65 and 66 to be illuminated equally. As previously explained, when lamps 65 and 66 are of equal illumination, photo-resistors 73 and 74 will provide equal resistance values, and no signal will be developed at terminal 79 of optical-electrical bridge 72 since there is no quadrature component in the original error signal. Under these conditions no feedback signal is required.

Assume now the same circuit conditions, but that in this case the error signal input "e" to amplifier 14 contains a quadrature component. Assume also that the error signal, as produced by the transducer-balancing network, is in-phase with the reference line voltage and that the quadrature component is lagging the error signal by 90 degrees. Quadrature detector and suppressor device 19 will treat this process signal with its quadrature component as will now be described.

FIG. 3a shows the reference line voltage phase. FIG. 3e shows an error signal with a lagging quadrature component. The error signal as produced by the transducer-balancing network system is labeled θ1, and the lagging quadrature voltage of the error signal is labeled θ2. The error signal θ1 and quadrature component θ2 are coupled by transformer 21 to tube 24, amplified by tubes 24 and 29, and appear at plate 31 of tube 29 in the same phase relationship to the reference line voltage as shown in FIG. 3e. FIG. 3f shows the phase relationship of error signal θ1 and quadrature component θ2, each having been phase-shifted 90 degrees in passing through tubes 39, 48 and 56 of transformer 61. FIG. 4b shows the result of combining the voltages appearing at optical-electrical bridge 64. In FIG. 4b, vector V3 is the voltage across lamp 65 and vector V4 is the voltage across lamp 66 due to supply voltage X–Y, with vector V4 being equal in magnitude but opposite in phase to vector V3 for reasons previously explained. By virtue of the polarities indicated on transformer 61, voltage vector $V\theta2$ will drive terminal or junction 70 negatively when the reference line voltage is positive and this results in a decrease in voltage vector V4, indicated as $V4-\theta2$, and an increase in voltage vector V3, indicated as $V3+\theta2$, as shown in FIG. 4c. When vector $V3+\theta2$ is vectorially added to vector $V\theta1$, and vector $V4-\theta2$ is vectorially added to vector $V\theta1$ (vector $V\theta1$ being in quadrature to both vectors $V4-\theta2$ and $V3+\theta2$, as previously shown), it is evident that a greater resultant voltage occurs across lamp 65 than across lamp 66 and therefore lamp 65 will be illuminated more brightly, see FIG. 4d.

As a result of lamp 65 being of higher light intensity than lamp 66, more light will fall upon photo-resistive element 73 than upon photo-resistive element 74, and photo-resistive element 73 will therefore have less resistance than photo-resistive element 74. Terminal 70 will therefore be driven positive, producing a signal voltage 180 degrees out-of-phase with the reference line voltage and in-phase with the voltage across photo-resistive element 74. FIG. 3g shows this signal voltage with respect to the reference line voltage of FIG. 3a.

The signal developed at terminal 79 is the result of the presence of a quadrature component of error signal "e." This signal is impressed on grid 85 of tube 81, is amplified and then coupled to grid 91 of cathode-follower tube 90. The choice of design parameters of tube circuits 81 and 90 is such that from junction 79 to output of cathode 92 of tube 90, the signal has been phase-shifted 90 degrees. FIG. 3h shows the phase relationship of output signal of cathode-follower tube 90 with respect to reference line voltage of FIG. 3a and with respect to quadrature component in error signal "e" shown in FIG. 3e. It is evident that the output signal of cathode-follower 90 is in-phase with the quadrature component as it appears at plate 31 of tube 29, and hence is of the proper polarity to effect suppression of the quadrature component when coupled to cathode 29a of tube 29. This is accomplished by connecting cathode 92 of tube 90 through resistor 95 to cathode 29a of tube 29 as shown in FIG. 2.

The magnitude of the output signal of cathode-follower 90, which is sufficient to substantially effect full suppression of the quadrature component of error signal "e," is established by the adjustment of gain control potentiometer 38.

The foregoing descriptive material illustrated and described is the input signal to the quadrature detector and suppressor circuit as being derived from a particular element of an amplifier stage and the feedback signal from the quadrature detector and suppressor circuit as being coupled into a particular element in the same stage of the amplifier. However, it will be appreciated from the circuit schematics included that, insofar as the functioning of the quadrature detector and suppressor circuit is concerned, it is not important from where its input signal is taken, nor at which point in a particular circuit its feedback is injected. It is necessary only that the feedback signal be in proper polarity to effect concellation of the undesired voltage component.

In one embodiment of the invention particular emphasis was given to providing shielding so that the illumination of each lamp in the optical-electrical bridge was directed to impinge only upon its associated photo-resistive element and that each photo-resistive element was not influenced by light from external sources.

While the invention has been particularly shown and described with reference to a preferred embodiment thereof, it will be understood by those skilled in the art that various changes in form and details may be made therein without departing from the spirit and scope of the invention.

We claim:
1. A circuit for suppressing a signal in quadrature time phase relation with respect to a desired reference comprising in combination:
   (a) a first bridge circuit comprising light sources connected in series with one another to form an arm of an electrical bridge;
   (b) a resistance means connected in parallel with said light sources;
   (c) means for connecting a source of alternating current across said light sources;
   (d) means for coupling an input signal to the junction of said light sources whereby said light source means provides illumination of equal intensity;
   (e) a quadrature signal component in said input signal which causes said light source means to provide illumination of unequal intensity;
   (f) a second bridge circuit including a pair of photo-resistive elements connected in series with one another to form two arms of said second bridge;
   (g) said photo-resistive elements having a resistance related to the intensity of illumination impinging thereon whereby unequal illumination of said lamps causes a difference in the resistance of said photo-resistive elements to thereby unbalance said second bridge circuit to provide an output signal; and,
   (h) means for coupling said output signal from said second bridge circuit as a feedback to suppress the quadrature component of the input signal.

2. A circuit as in claim 1 wherein said means for coupling said input signal comprises:
   (a) transformer means which couples a signal to combine with said source of alternating current to energize said first bridge circuit whereby said light source means provides relatively equal illumination; and,
   (b) an undesired quadrature signal component coupled to said first bridge circuit by said signal providing means causing said first bridge circuit to be unbalanced and said light source means to provide unbalanced illumination to said respective photo-resistive means to thereby cause said second bridge circuit to provide an electrical signal representative of the unbalanced condition.

3. In a weighing system comprising:
   (a) means for receiving a signal indicative of a weight being measured;
   (b) means for connecting said signal to a circuit arranged to detect and suppress a quadrature component in said signal;
   (c) a first optical-electrical bridge circuit including at least a pair of light source means;
   (d) means for adjusting said light source means to provide illumination of equal intensity when a signal coupled to said detector circuit has no quadrature component, and to provide illumination of unequal intensity when a quadrature component is present in said signal;
   (e) a second optical-electrical bridge circuit including at least a pair of photo-resistive elements to be energized by respective ones of said light sources;
   (f) means for adjusting said photo-resistive elements to provide a substantially zero signal when they are energized by equal illumination; and
   (g) said photo-resistive elements providing a signal of a magnitude and polarity dependent on their respective energization by said light source means; and,
   (h) means for coupling the output from said second bridge circuit as a feedback control to said system signal receiving means to suppress the quadrature component of said signal.

4. A weighing system as in claim 3 further comprising:
   (a) a servomotor connected to said receiving means and arranged to be energized by said signal to drive an indicator means to provide an indication of said weight; and (b) said photo-resistive elements are connected to provide a signal of a magnitude and polarity dependent on their respective energization by said light source means.

References Cited

UNITED STATES PATENTS

| | | | |
|---|---|---|---|
| 1,708,544 | 4/1929 | Kummerer | 324—83 X |
| 2,554,987 | 5/1951 | Hogle | 328—166 |
| 2,947,875 | 8/1960 | Beck | 250—210 X |
| 3,039,004 | 6/1962 | Wilmotte | 250—210 |
| 3,109,939 | 11/1963 | Chin et al. | 328—166 X |
| 3,231,745 | 1/1966 | Doubek et al. | 250—210 |
| 3,247,387 | 4/1966 | Doubek et al. | 250—210 |
| 3,248,549 | 4/1966 | Sanabria | 250—210 |

RICHARD B. WILKINSON, *Primary Examiner.*

G. H. MILLER, *Assistant Examiner.*